United States Patent
Stang et al.

(10) Patent No.: US 9,193,244 B2
(45) Date of Patent: Nov. 24, 2015

(54) AIR MIXING AND DISTRIBUTION APPARATUS AND VEHICLE HEATING OR AIR-CONDITIONING SYSTEM

(75) Inventors: Andreas Stang, Grossheirath (DE); Albert Gwosdek, Haslach (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 819 days.

(21) Appl. No.: 13/399,154

(22) Filed: Feb. 17, 2012

(65) Prior Publication Data

US 2012/0252342 A1 Oct. 4, 2012

(30) Foreign Application Priority Data

Feb. 18, 2011 (DE) .......................... 10 2011 011 710

(51) Int. Cl.
*B60S 1/54* (2006.01)
*B60H 1/00* (2006.01)

(52) U.S. Cl.
CPC ................ *B60H 1/0005* (2013.01); *B60H 1/00* (2013.01); *B60H 2001/00092* (2013.01)

(58) Field of Classification Search
USPC ......................................................... 454/126
IPC ....................................... B60H 1/00,2001/0009
See application file for complete search history.

(56) References Cited

U.S. PATENT DOCUMENTS

| | | | |
|---|---|---|---|
| 5,988,263 A | 11/1999 | Schwarz | |
| 6,607,029 B2 * | 8/2003 | Danieau | 165/203 |
| 8,869,876 B2 * | 10/2014 | DiGasbarro et al. | 165/42 |
| 2002/0157811 A1 * | 10/2002 | Vincent | 165/59 |
| 2003/0045224 A1 * | 3/2003 | Vincent | 454/156 |

FOREIGN PATENT DOCUMENTS

| | | |
|---|---|---|
| DE | 19881087 T1 | 9/1999 |
| FR | 959794 A | 4/1950 |

OTHER PUBLICATIONS

English language abstract for DE 19881087 extracted from the espacenet.com database on May 16, 2012, 25 pages.
Machine Translation for FR 959794 extracted from the espacenet.com database on Jun. 13, 2012, 12 pages.

* cited by examiner

*Primary Examiner* — Alissa Tompkins
*Assistant Examiner* — Helena Kosanovic
(74) *Attorney, Agent, or Firm* — Howard & Howard Attorneys PLLC

(57) ABSTRACT

The invention relates to an air mixing and distribution apparatus (32) and to a vehicle heating or air-conditioning system (10) having an air distribution chamber (30), into which a cold air duct (16) opens with a cold air opening (26) and a warm air duct (20) opens with a warm air opening (28). The warm air opening (28) is formed by the outlet of a heat exchanger (22), the cold and warm air openings (26, 28) lie next to one another and in the same plane (34), and the cold air which flows through the cold air opening (26) and the warm air which flows through the warm air opening (28) flow into the air distribution chamber (30). The air distribution chamber (30) has a mixed air outlet (42) for the windscreen and a mixed air outlet (44) for a front diffuser, the mixed air outlets (42, 44) being spaced apart from one another. The apparatus (32) also includes a first air deflection element (52) and a second air deflection element (56).

20 Claims, 8 Drawing Sheets

Figure 1:
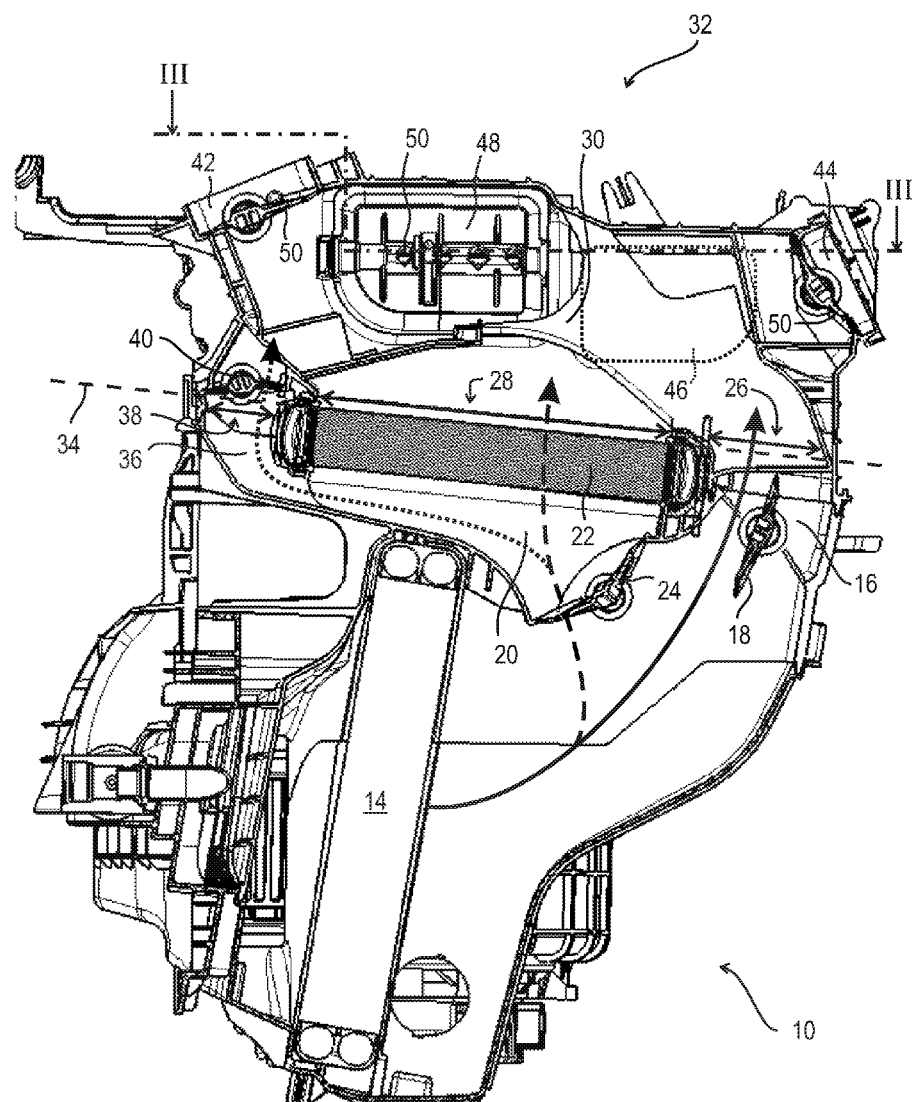

AIR MIXING AND DISTRIBUTION APPARATUS AND VEHICLE HEATING OR AIR-CONDITIONING SYSTEM

RELATED APPLICATIONS

This application claims priority to and all the advantages of German Patent Application No. 10 2011 011710.5, filed on Feb. 18, 2011.

The invention relates to an air mixing and distribution apparatus for a vehicle heating or air-conditioning system having an air distribution chamber, into which a cold air duct opens with a cold air opening and a warm air duct opens with a warm air opening, and to a vehicle heating or air-conditioning system having an air mixing and distribution apparatus of this type.

Vehicle heating or air-conditioning systems are known from the prior art, in which systems cold air and warm air are mixed in a first mixing apparatus and the mixed air is distributed in a distribution apparatus connected downstream to various outlet ducts to diffusers at various locations in the vehicle.

For example, FR 0 959 794 discloses an air mixing apparatus, in which cold air and warm air flow through separate ducts which engage into one another in a comb-like manner. The different air streams can be mixed in a common mixing chamber which is provided downstream of the ducts. An air distribution apparatus in turn has to be arranged downstream of the mixing chamber.

DE 198 81 087 T1 provides an air mixing and distribution apparatus having an air distribution chamber with a mixing region, cold air and warm air flowing in each case in different directions into the mixing region, and nozzles which increase the flow speed and in this way make satisfactory mixing possible being formed in the flow duct of the warm air. The warm air flow duct requires additional installation space for the corresponding deflection of the warm air and for the formation of the nozzles.

It is an object of the invention to provide a compact air mixing and distribution apparatus and a vehicle heating or air-conditioning system which requires a small amount of installation space.

According to the invention, this object is achieved by an air mixing and distribution apparatus for a vehicle heating or air-conditioning system, having an air distribution chamber, into which a cold air duct opens with a cold air opening and a warm air duct opens with a warm air opening. The warm air opening is formed by the outlet of a heat exchanger, the cold air opening and the warm air opening lie next to one another in the same plane, and the cold air which flows through the cold air opening and the warm air which flows through the warm air opening flow into the air distribution chamber substantially in the same main flow direction. The air distribution chamber has a mixed air outlet for the windscreen and a mixed air outlet for a front diffuser, the mixed air outlets being spaced apart from one another. A first air deflection element is provided within the air distribution chamber, which first air deflection element deflects the warm air flow in the direction of the cold air opening, and a second air deflection element is provided within the air distribution chamber, which second air deflection element deflects the cold air flow in the direction of the warm air opening.

As a result of the air deflection elements, the cold air and warm air which flow into the air distribution chamber are both mixed satisfactorily in a small installation space and are distributed to the various mixed air outlets. No air deflection elements are required outside the air distribution chamber either. As a result of the deflection of both air flows, the air distribution chamber can be of compact configuration. Since the warm air opening is formed directly by the outlet of a heat exchanger and the cold air opening and the warm air opening lie next to one another and in the same plane, no air ducts connected in between for cold air and/or warm air before the entry into the air distribution chamber are required. This makes a compact configuration of the air mixing and distribution apparatus and therefore of the vehicle heating or air-conditioning system possible.

For example, the air distribution chamber has two opposed lateral mixed air outlets for lateral diffusers, and the first air deflection element is continuous in the lateral direction, that is to say without gaps. In this way, a substantially homogeneous deflection of the warm air flow is made possible.

The second air deflection element can have a plurality of air diversion ducts for cold air which are spaced apart from one another laterally, the air diversion ducts preferably being V-shaped or U-shaped in cross section, the air diversion ducts diverting cold air, in particular, beyond the first air diversion element to a mixed air outlet. In this way, firstly an advantageous distribution of the cold air to various mixed air outlets is made possible, whereas secondly warm air can flow through between the air diversion ducts which are spaced apart and a mixture of cold air and warm air is therefore made possible in this region.

For example, the overall width of all the air diversion ducts of the second air deflection element to the width of the air distribution chamber has a ratio between 0.1 and 0.8 and preferably between 0.2 and 0.5, which was the result during intensive research work as an optimum compromise between the air quantity through the air-discharging air diversion ducts and the space for the direct mixing of air between the ducts.

An optimum adaptation to an air distribution chamber with a small volume can be achieved by the first air deflection element extending such that it is bent towards the second air deflection element and the air diversion ducts extending such that they are bent towards the first air deflection element.

An improved distribution of the cold air to various mixed air outlets can be achieved by the air diversion ducts of the second air deflection element having a first part duct and a second part duct which lead to the mixed air outlet for the front diffuser and to the mixed air outlet for the windscreen, respectively.

It is possible that a cold air bypass opening is provided which opens into the air distribution chamber and is arranged next to the warm air opening on that side of the warm air opening which faces away from the cold air opening. In this way, improved air mixing can be achieved, in particular if a relatively large warm air opening in comparison with the cold air opening is provided and one of the mixed air outlets is arranged on the other side of the warm air opening relative to the cold air opening and is at a great spacing from the cold air opening.

A bypass deflection element can be provided, preferably integrally on the first air deflection element, which bypass deflection element guides a bypass cold air flow through the cold air bypass opening to at least one mixed air outlet, the bypass deflection element dividing the bypass cold air flow, in particular, in the direction of the mixed air outlet for the windscreen and for side diffusers. The bypass deflection element therefore makes an improved distribution of the bypass cold air flow possible. This makes an optimum adaptation of the air distribution and mixing for individual mixed air outlets possible.

At least one pair of mixed air outlets for front diffusers can be provided on a side wall of the air distribution chamber.

The air distribution chamber preferably has a centre wall which extends in the main flow direction and substantially centrally between side walls and divides the air distribution chamber into two halves which are in each case assigned to one vehicle side. In this way, the sidewise air mixing and distribution, for example to side diffusers, is improved, in particular in the case of a different degree of opening.

For example, mixed air outlets for side diffusers are provided on opposite side walls of the air distribution chamber.

Furthermore, first cold air shut-off elements can be provided which are arranged in the region of the side walls and form baffle plates for the cold air flow to the mixed air outlets for side diffusers. In this way, the air mixing and distribution for the mixed air outlets for side diffusers can be optimized.

Furthermore, second cold air shut-off elements can be provided which lie in the region of the cold air opening and close sections of the flow cross section, the second cold air shut-off elements being arranged in the centre of the air distribution chamber in the lateral direction of the apparatus and preferably being configured in such a way that the flow cross section increases towards the lateral ends. As a result of the second cold air shut-off elements, the cold air flow is reduced in the region of the centre of the air distribution chamber and the cold air flow in the region of the lateral ends is therefore increased relatively.

In one particularly compact embodiment, the maximum height of the air distribution chamber is to be smaller than the root of the area of the warm air opening, preferably smaller than 0.6 times the root of the area of the warm air opening, which improves the compactness.

The first air deflection element can form a crossflow opening for warm air, through which the warm air flow flows in the air distribution chamber, the area ratio of the effective cross section of the crossflow opening to the area of the outlet of the heat exchanger being between 0.9 and 0.3, preferably between 0.65 and 0.45.

The object of the invention is achieved, furthermore, by a vehicle heating or air-conditioning system, having an above-described air mixing and distribution apparatus, a cold air duct being provided with a cold air flap and a warm air duct being provided with a heat exchanger and a warm air flap which is arranged upstream of the heat exchanger.

In this way, a compact design of the vehicle heating or air-conditioning system is provided. The air flows through the cold air duct and the warm air duct are controlled by the cold air flap and the warm air flap, respectively. The cold air flap and the warm air flap can be configured as two separate flaps or, inter alia, also as one common flap.

A cold air bypass duct is preferably provided which connects the warm air duct to the air distribution chamber downstream of the warm air flap with bypassing of the heat exchanger and has a bypass flap. This makes control of the bypass cold air flow by the cold air bypass opening possible.

It is possible that the bypass flap is actuated as a function of the degree of opening of the cold air flap and/or of the warm air flap, in particular via mechanical coupling of the flaps.

One of the air deflection elements or a further air deflection element of the air distribution chamber preferably forms a holder of the heat exchanger and stabilizes the housing of the system. In this way, the air mixing and distribution functions and structural functions can be combined in one component or one assembly, as a result of which the number of different components is reduced and therefore a simple and compact design of the system is made possible.

Figure 2:
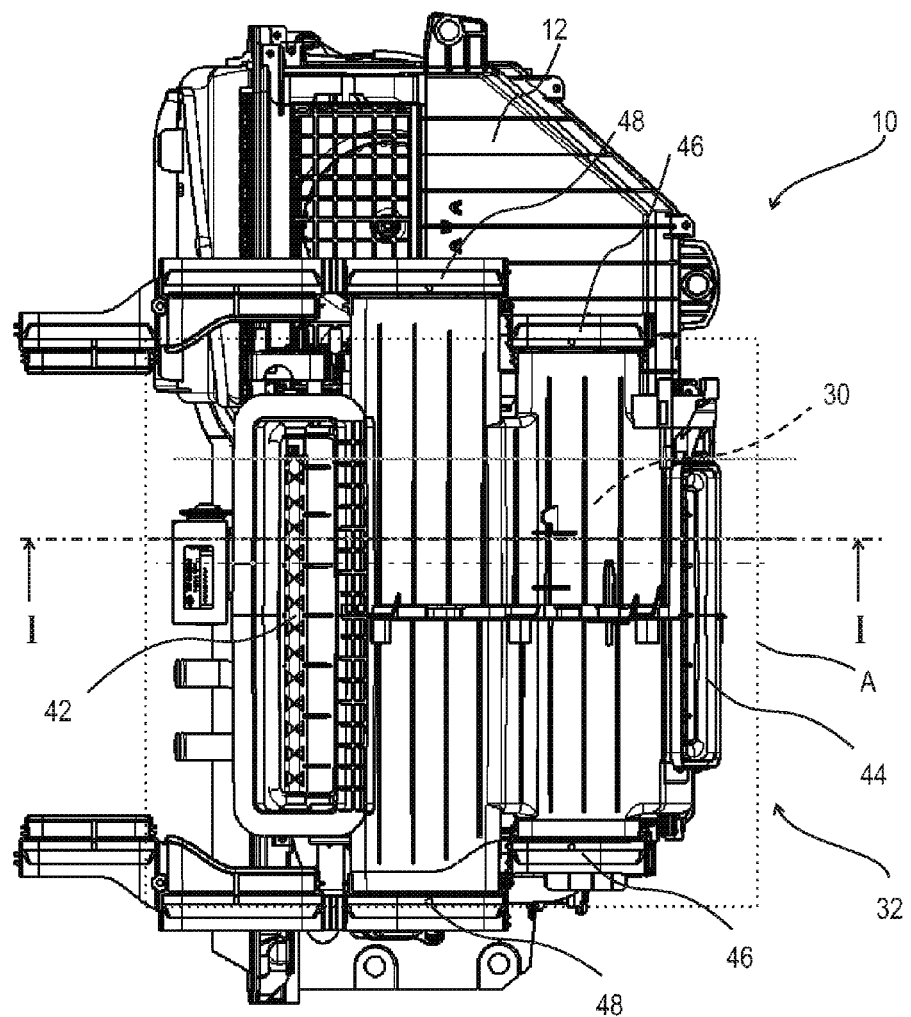
Figure 3:
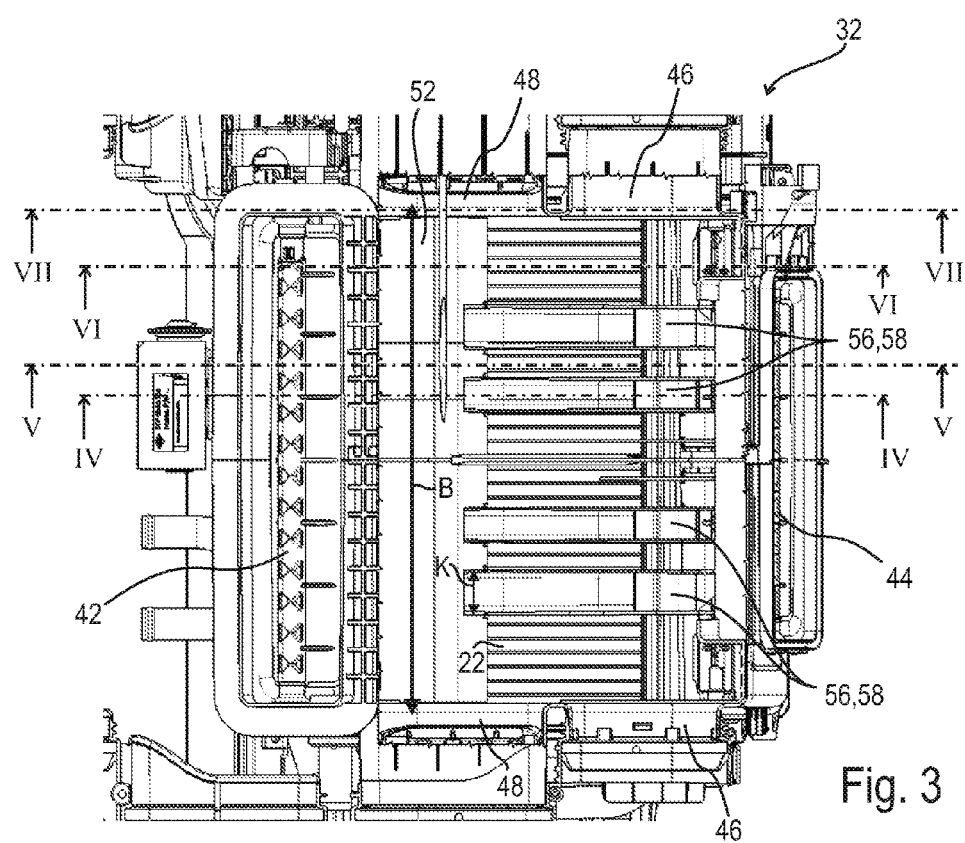
Figure 4:
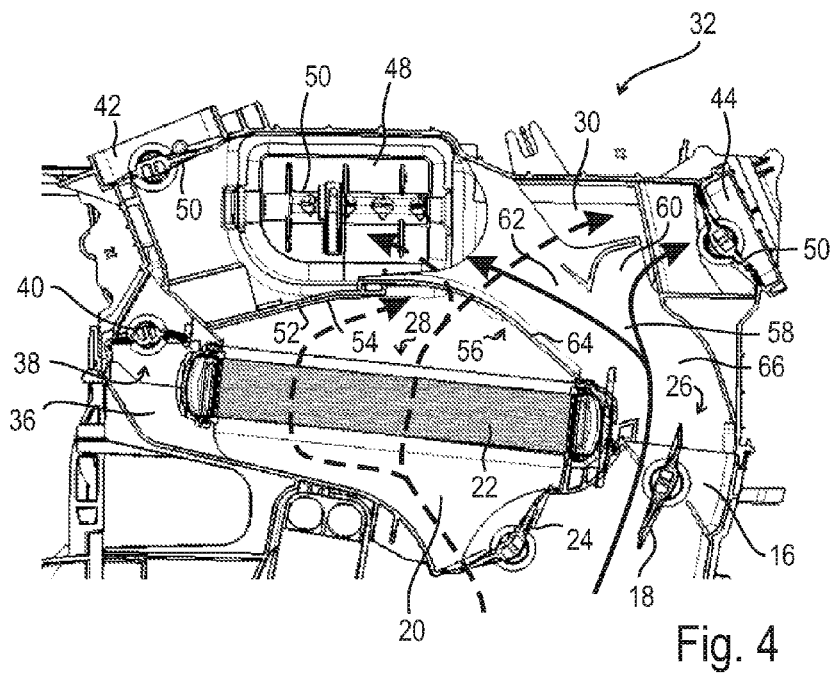
Figure 5:
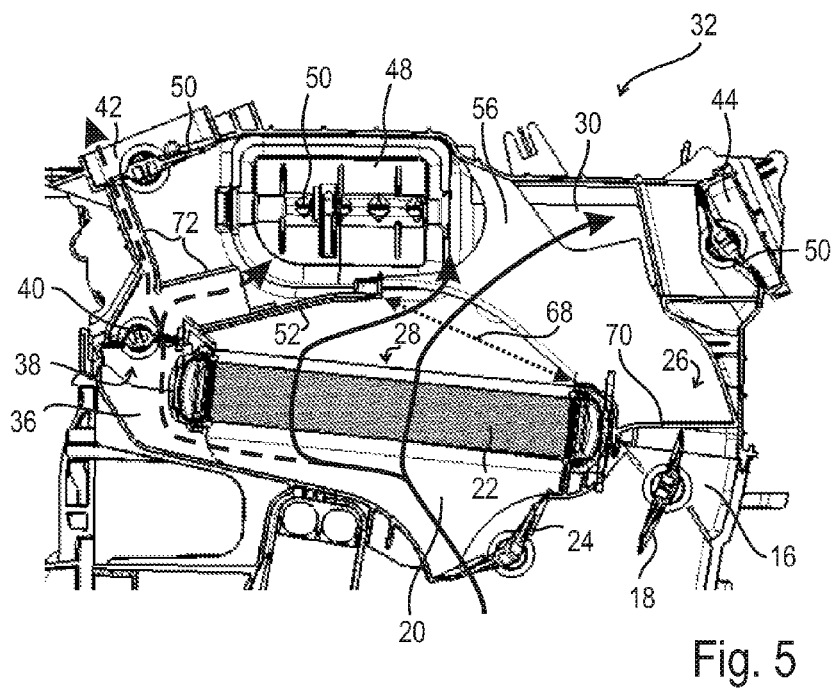
Figure 6:
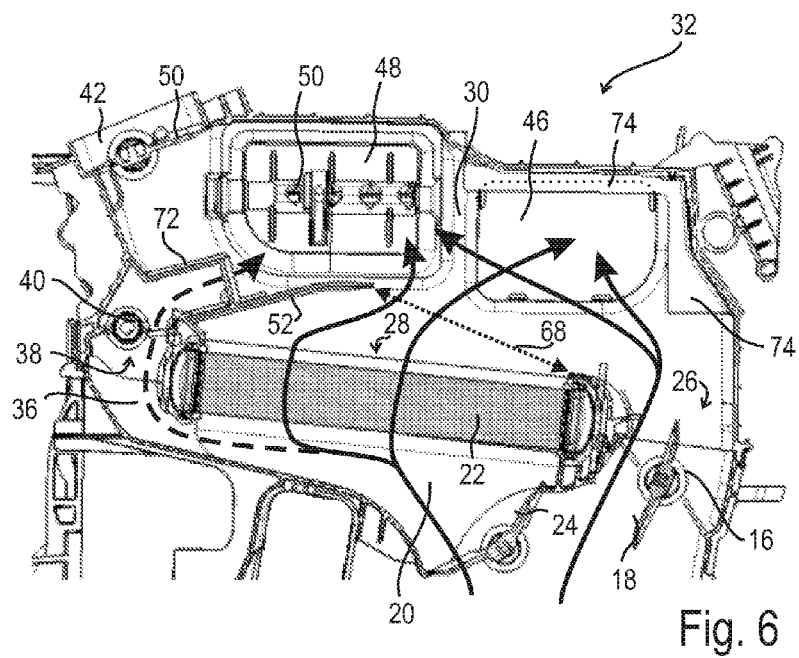
Figure 7:
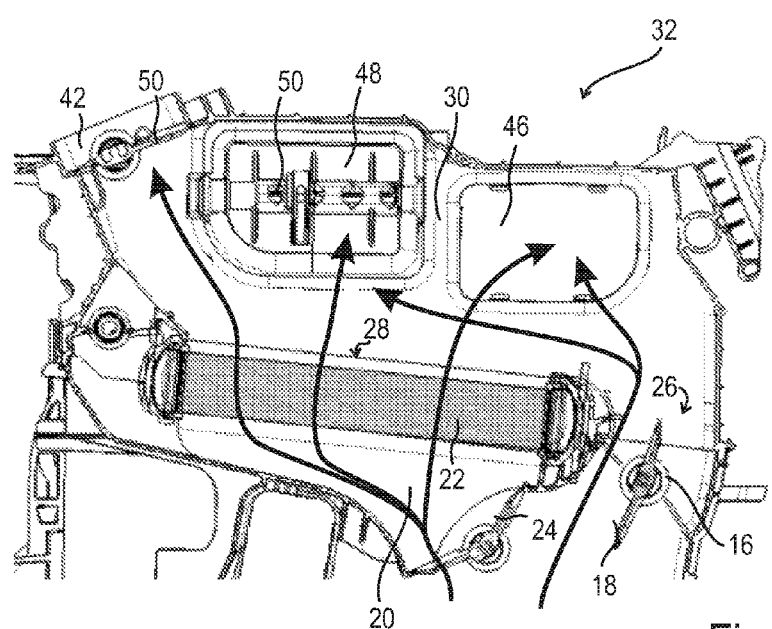
Figure 8:
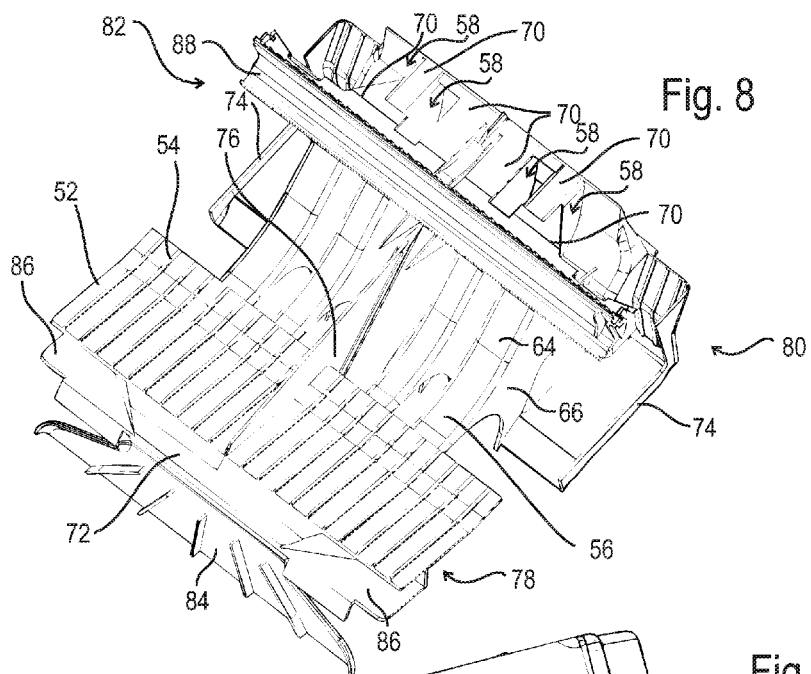
Figure 9:
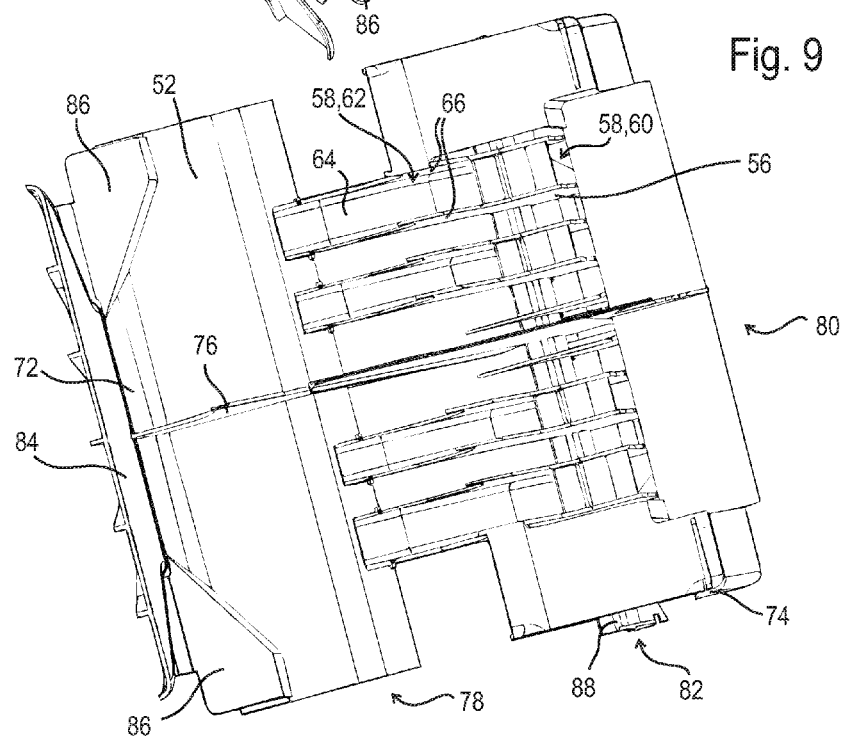
Figure 10:
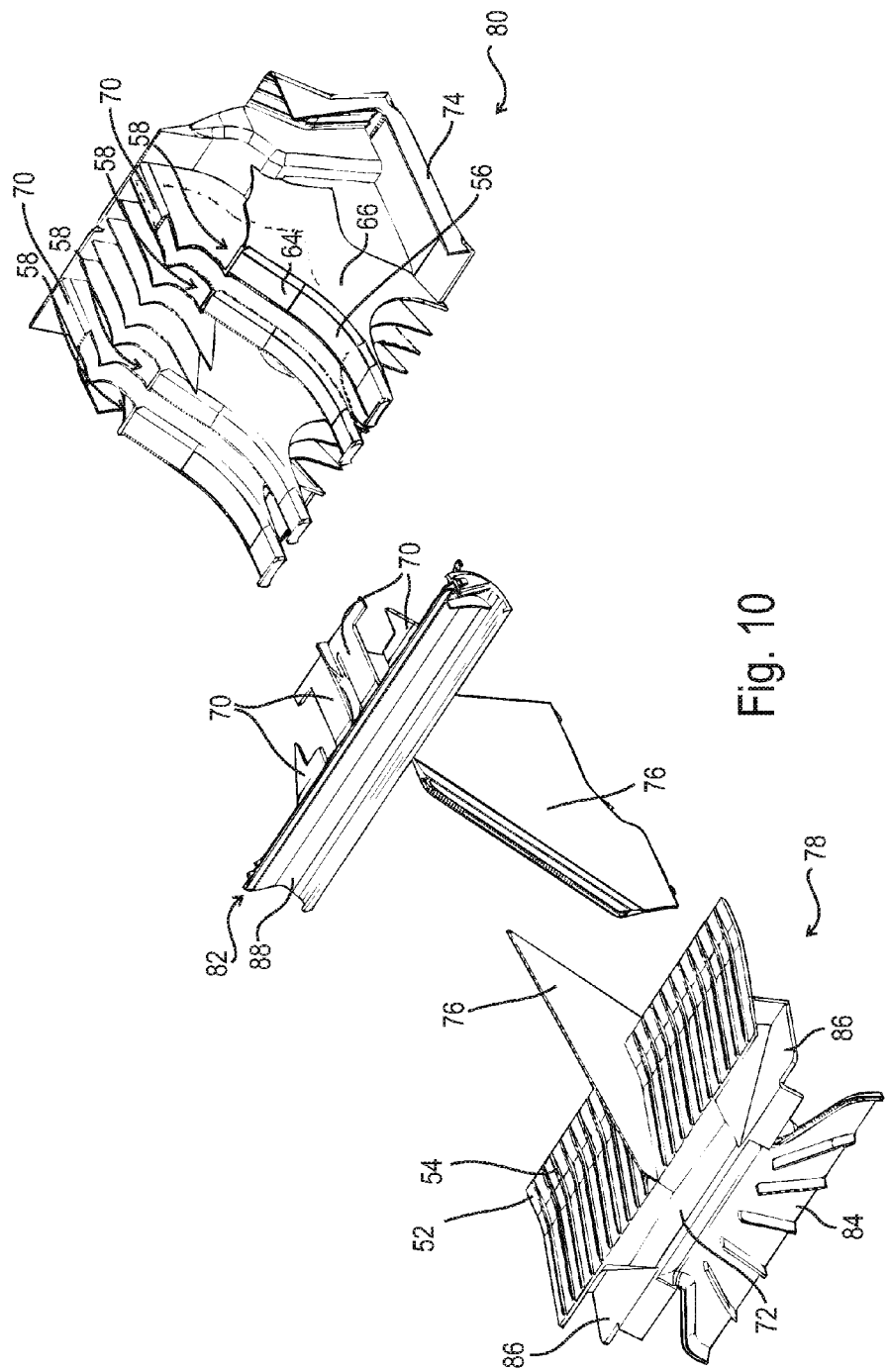
Figure 11:
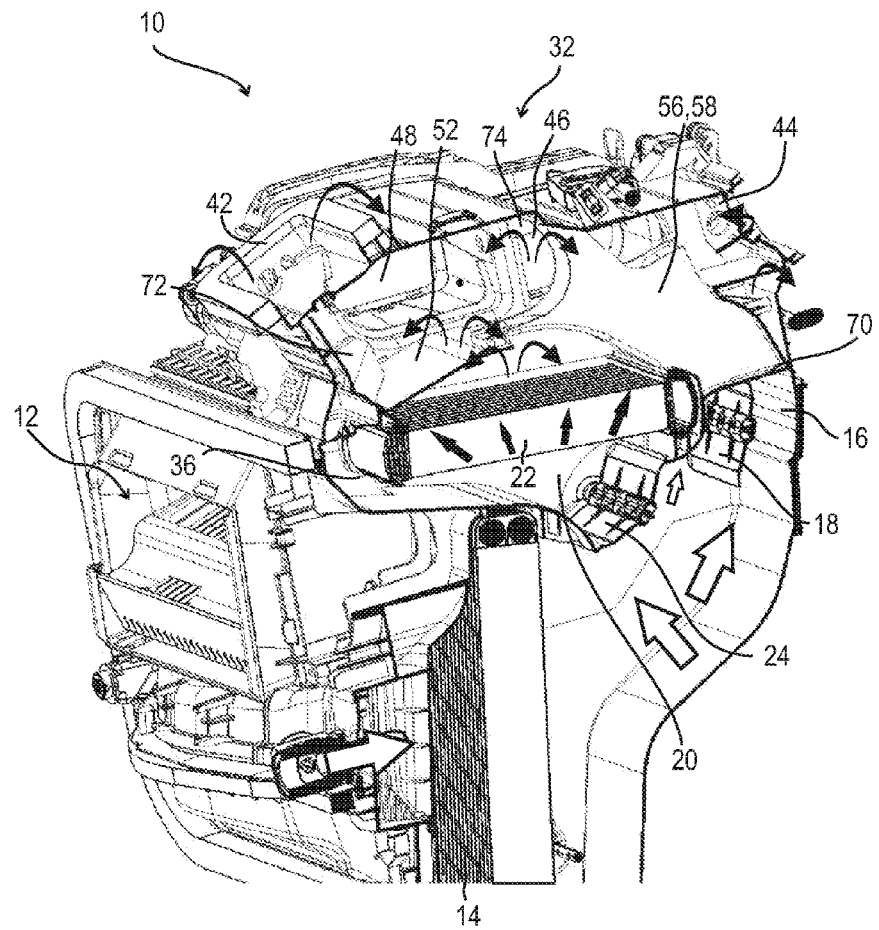

Further features and advantages of the invention result from the following description and from the drawings, to which reference is made. In the drawings:

FIG. 1 shows a side sectional view of a vehicle air-conditioning system according to the invention along the sectional plane I-I in FIG. 2, FIG. 2 shows a plan view of the vehicle air-conditioning system according to FIG. 1, FIG. 3 shows a sectional view of an air mixing and distribution apparatus according to the invention of the vehicle air-conditioning system along the sectional plane III-III in FIG. 1, FIG. 4 shows a detailed view of the air mixing and distribution apparatus along the sectional plane IV-IV in FIG. 3, FIG. 5 shows a detailed view of the air mixing and distribution apparatus along the sectional plane V-V in FIG. 3, FIG. 6 shows a detailed view of the air mixing and distribution apparatus along the sectional plane VI-VI in FIG. 3, FIG. 7 shows a detailed view of the air mixing and distribution apparatus along the sectional plane VII-VII in FIG. 3, FIG. 8 shows a perspective view of the air deflection elements of the air mixing and distribution apparatus according to FIG. 3 from below, FIG. 9 shows a further perspective view of the air deflection elements according to FIG. 8 from above, FIG. 10 shows an exploded view of three assemblies which form the air deflection elements according to FIG. 8, and FIG. 11 shows a perspective sectional view of the vehicle air-conditioning system according to FIG. 1.

The invention will be described in the following text using a vehicle air-conditioning system 10 which is shown in FIGS. 1 and 2. It is also possible that the system is configured as a pure vehicle heating system without an evaporator for cooling the air. In this case, the temperature of cold air corresponds to the temperature of air which is sucked in.

Via an air intake apparatus 12 (see FIG. 2), air is sucked out of the surroundings of the vehicle or during recirculated air operation from the vehicle interior and is preferably filtered. The air which is sucked in flows through an evaporator 14 (see FIG. 1) which makes it possible to cool the air which is sucked in.

A cold air duct 16 having a cold air flap 18 and a warm air duct 20 having a heat exchanger 22 and a warm air flap 24 which is arranged upstream of the heat exchanger 22 are provided downstream of the evaporator 14 (see FIG. 1). The heat exchanger 22 makes it possible to heat the air which flows through the warm air duct 20.

The cold air duct 16 and the warm air duct 20 open with a cold air opening 26 and a warm air opening 28, respectively, into an air distribution chamber 30 of an air mixing and distribution apparatus 32 of the vehicle air-conditioning system 10. The warm air opening 28 is formed by the outlet of the heat exchanger 22 and defines a plane 34. The cold air opening 26 lies next to the warm air opening 28 in the same plane 34. On account of this arrangement, warm air and cold air flow substantially in the parallel direction next to one another into the air distribution chamber 30 of the air mixing and distribution apparatus 32. In FIG. 1, the cold air flow is shown by a continuous arrow and the warm air flow is shown by a dashed arrow.

A cold air bypass duct 36 is provided which connects the warm air duct 20 downstream of the warm air flap 24 to the air distribution chamber 30 via a cold air bypass opening 38 with the heat exchanger 22 being bypassed. The cold air bypass opening 38 is arranged next to the warm air opening 28 on that side of the warm air opening 28 which faces away from the cold air opening 26, and lies in the plane 34 of the warm air opening 28.

The opening cross sections of the cold air opening 26, warm air opening 28 and the cold air bypass opening 38 are shown in FIG. 1 by double arrows.

A bypass flap 40 which makes it possible to control a bypass cold air flow through the cold air bypass opening 38 is arranged at the cold air bypass opening 38. In the exemplary embodiment, the bypass flap 40 is actuated by mechanical coupling of the flaps as a function of the degree of opening of the cold air flap 18 and the warm air flap 24. The bypass cold air flow is shown in FIG. 1 by a dotted arrow.

The air distribution chamber 30 has a plurality of mixed air outlets 42, 44, 46, 48. One or more mixed air outlets 42 for the windscreen are provided in the region of the upper end side of the air distribution chamber 30 and one or more mixed air outlets 44 for a front diffuser are provided on the front side. The outlets 42, 44 therefore lie at opposite upper ends of the chamber 30. In each case two mixed air outlets 46, 48 for side diffusers are provided on the lateral walls of the air distribution chamber 30 (cf. FIG. 2). The side diffusers are assigned in each case to one vehicle side, the mixed air outlets 46 being assigned to side diffusers in the region of the vehicle doors and the mixed air outlets 48 being assigned to side diffusers in the footwell. The mixed air outlet 46 is hidden by other components in FIG. 1 and is shown by a dotted line.

The mixed air outlets 42, 44, 46, 48 are assigned in each case to a dedicated mixed air flap 50 which makes it possible to control the opening cross section of the respective mixed air outlet 42, 44, 46, 48. It is of course also conceivable that the mixed air outlets 42, 44, 46, 48 are arranged in another way or else a different number of mixed air outlets 42, 44, 46, 48 is provided. For example, in each case two mixed air outlets 42, 44 for the windscreen and the front diffuser can be provided, which mixed air outlets 42, 44, 46, 48 are assigned in each case to one side of the air distribution chamber 30.

The air distribution chamber 30 is of very compact configuration, the maximum height of the air distribution chamber 30 being smaller than the root of the area of the warm air opening 28.

A plurality of air deflection elements and air shut-off elements are provided in the interior of the air distribution chamber 30, which air deflection elements and air shut-off elements perfectly mix the cold air and warm air flowing into the air distribution chamber 30 and distribute it to the various mixed air outlets 42, 44, 46, 48. The air deflection elements and air shut-off elements will be described in the following text using FIGS. 3 to 10.

FIG. 3 shows a detailed view of the framed detail A in FIG. 2 of the air mixing and distribution apparatus 32 with an open air distribution chamber 30 along the sectional plane III-III of FIG. 1. The drawings in each case show a position of the flaps 18, 24, 40, in which the cold air flap 18 is completely open and the warm air flap 24 and the bypass flap 40 are closed. For the sake of simplicity, however, the method of operation with a correspondingly open warm air and bypass flap 24, 40 will also be explained using the same drawings and will be shown by corresponding flow arrows.

A first air deflection element 52 (see FIGS. 3 to 6 and 8 to 11) is provided which deflects the warm air flow which flows out of the warm air opening 28 in the direction of the cold air opening 26. The first air deflection element 52 extends approximately over the entire width B of the air distribution chamber 30 and is preferably of continuous configuration in this direction, without a hole. The warm air opening 28 is released by the first air deflection element 52 merely in the region of the side walls with the mixed air outlets 46, 48 for side diffusers, with the result that warm air can flow, in particular, directly to the mixed air outlets 46, 48 for side diffusers (cf. FIG. 7).

The first air deflection element 52 has a plurality of ribs 54 (see FIG. 8) which extend in the direction of the cold air opening 26 and make a homogeneous deflection of the warm air flow possible over the entire width of the first air deflection element 52. In side view, the element 32 extends slightly arcuately in the direction of the cold air opening 26. A direct flow of the warm air to the outlet 42 is not possible in the region of the element 52 and is prevented by the element 52.

A second air deflection element 56 is provided which deflects the cold air flow in the direction of the warm air opening 28 (see FIGS. 3 to 6 and 8 to 11). The second air deflection element 56 has a plurality of air diversion ducts 58 for cold air with a width K, which air diversion ducts 58 are spaced laterally apart from one another and project in a finger-like manner. The warm air flow can flow through, in particular, between the air diversion ducts which are spaced apart from one another. The overall width of all the air diversion ducts 58 of the second air deflection element 56 has a ratio to the width B of the air distribution chamber 30 of between 0.2 and 0.5.

FIG. 4 shows a section through one of the air diversion ducts 58 of the second air deflection element 56. The air diversion duct 58 has a first part duct 60 to the mixed air outlet 44 for the front diffuser and a second part duct 62 to the mixed air outlet 42 for the windscreen. The cold air flow through the cold air opening 26 and the two part ducts 60, 62 of the air diversion duct 58 are shown by the arrows with continuous lines.

The second part duct 62 diverts cold air over the first air deflection element 52 to the mixed air outlet 42 of the windscreen. The cold air is mixed with the warm air which flows upwards between the air diversion ducts 58 which are spaced apart at the respective ends of the two part ducts 60, 62 of the air diversion duct 58 for cold air.

The air diversion ducts 58, in particular in the region of the second part duct 62, are of U-shaped configuration in cross section, with a base 64 and two side walls 66 (see FIGS. 8 and 9) which divert the cold air flow and prevent penetration of the warm air flow into the air diversion duct 58. The side walls 66 of the air diversion ducts 58 extend up to the upper wall of the air distribution chamber 30.

The warm air flow between the air diversion ducts 58 is labelled by the dashed arrows in FIG. 4 and will be explained in greater detail in the following text using FIG. 5.

FIG. 5 shows a section through the air distribution chamber 30 between two air diversion ducts 58 for cold air which are spaced apart from one another.

Warm air which flows through the heat exchanger 22, shown by the continuous arrows in FIG. 5, is deflected by the first air deflection element 52 in the direction of the cold air opening 26. The first air deflection element 52 which ends open to the right in relation to FIG. 5 defines a crossflow opening 68 for warm air in this region, through which crossflow opening 68 the warm air flow flows deeper into the air distribution chamber 30, the area ratio of the effective cross section of the crossflow opening 68 to the area of the outlet of the heat exchanger 22 being between 0.65 and 0.45.

The warm air flows between the air diversion ducts 58 of the second air deflection element 56 through to the mixed air outlets 42, 44, 46, 48.

Cold air shut-off elements 70 are provided in the region of the cold air opening 26, which cold air shut-off elements 70 close the cold air opening 26 in the region between adjacent air diversion ducts 58 and prevent a flow of cold air into the air distribution chamber 30 in this region.

The bypass cold air flow is shown in FIG. 5 by the dashed arrows. Here, cold air flows in the warm air duct 20 past the heat exchanger 22 through the cold air bypass duct 36 to the cold air bypass opening 38 and the bypass flap 40. A bypass deflection element 72 is provided downstream of the cold air bypass opening 38, which bypass deflection element 72 guides the bypass cold air flow firstly to the mixed air outlet 42 of the windscreen and secondly to the mixed air outlet 48 of the side diffuser for the footwell.

FIG. 6 shows a sectional view through the air distribution chamber 30 between an air diversion duct 58 of the second air deflection element 56 and the side wall of the air distribution chamber 30. The first air deflection element 52 is configured analogously to the preceding figures and diverts the warm air flow in the direction of the cold air opening 26. The cold air opening 26 is released and makes a cold air flow possible into the air distribution chamber 30, in which the cold air flow is mixed with the deflected warm air flow (both shown by way of continuous arrows). The air flows cross one another.

A cold air shut-off element 74 (see also FIG. 8) is provided in the region of the mixed air outlet 46 of the side diffuser, which cold air shut-off element 74 forms a baffle plate for the cold air flow to the mixed air outlet 46 for side diffusers. In this way, the proportion of cold air which passes to the mixed air outlet 46 for side diffusers is reduced. In the embodiment which is shown, the cold air shut-off element 74 is assigned only for the mixed air outlet 46 of the side diffuser for the doors, since this is arranged spatially close to the cold air opening 26.

The mixed air outlet 48 for the side diffuser of the footwell is arranged so as to be remote from the cold air opening 26. In order to ensure a sufficient cold air proportion at the mixed air outlet 48 of the side diffuser for the footwell, the bypass cold air flow (dashed arrow) is guided by the bypass deflection element 72 to the mixed air outlet 48.

FIG. 7 shows a sectional view in the region of the side wall of the air distribution chamber 30. In this region, no air deflection elements or cold air shut-off elements are provided. The cold air flow and warm air flow are shown in each case by continuous arrows.

The air deflection elements and cold air shut-off elements of the air distribution chamber 30 are shown in detail in FIGS. 8, 9 and 10, FIG. 8 showing a perspective view from below, from the viewing direction of the warm air opening 28, FIG. 9 showing a perspective view from the viewing direction from above, and FIG. 10 showing an exploded view of assemblies which are in each case integral within themselves and together form the air deflection elements and cold air shut-off elements.

A centre wall 76 is provided which divides the air distribution chamber 30 into two halves. In the embodiment which is shown, the two halves are of mirror-symmetrical configuration with respect to one another.

The centre wall 76 ensures uniform distribution and mixing of the air in both halves of the air distribution chamber 30, in particular when the side diffusers on different vehicle sides are open to a different extent and have differing flow rates.

Three assemblies 78, 80, 82 are provided which are in each case of single-piece configuration and are manufactured from plastic.

The first assembly 78 forms the first air deflection element 52, the bypass deflection element 72 and a section of the centre wall 76. The bypass deflection element 72 has a central, fan-shaped section 84 which guides the bypass cold air flow to the mixed air outlet 42 of the windscreen. Furthermore, two lateral sections 86 are provided which are of triangular configuration and have an opening which is directed to the side wall of the air distribution chamber 30 and guide the bypass cold air flow to the mixed air outlet 48 of the side diffuser.

The second assembly 80 forms the second air deflection element 56, the cold air shut-off elements 74 which are assigned to the mixed air outlet 46 of the side diffuser, and cold air shut-off elements 70 in sections which close the cold air opening 26 partially.

The first air deflection element 52 extends such that it is bent towards the second air deflection element 56 and the air diversion ducts 58 of the second air deflection element 56 extend such that they are bent towards the first air deflection element 52.

The air diversion ducts 58 are in contact with the first air deflection element 52 and therefore form a connection between the first assembly 78 and the second assembly 80. In the embodiment which is shown, the air diversion ducts 58 are fastened to the first air deflection element 52, as a result of which the stability is increased.

The converging air deflection elements 52, 56 which lie above the warm air opening result in a type of chamber within the air distribution chamber 30, which chamber contains predominantly warm air. This chamber has a plurality of elongate outlets into the rest of the air distribution chamber 30 in the region of the lattice-shaped air deflection element 56.

A third assembly 82 forms a further section of the centre wall 76 and cold air shut-off elements 70 in sections which close the cold air opening 26 partially. The cold air shut-off elements 70 are tapered towards the side walls of the air distribution chamber 30. In this way, the cold air flow is boosted in the direction of the side walls.

Furthermore, the third assembly 82 forms a holder 88 of the heat exchanger 22, which holder 88 extends over the entire width of the air distribution chamber 30. In this way, the housing of the vehicle air-conditioning system 10 is stabilized by the third assembly 82, and exact positioning of the assemblies 78, 80, 82 with respect to the heat exchanger 22 and the housing of the vehicle air-conditioning system 10 is made possible.

In this way, the assemblies 78, 80, 82 of the air deflection elements and cold air shut-off elements fulfil firstly the function of air mixing and distribution and secondly a structural function for stabilizing the housing of the vehicle air-conditioning system 10 and for positioning and fastening the heat exchanger 22.

The configuration of the various air deflection elements and cold air shut-off elements and the geometry and arrangement of the air distribution chamber 30 can be amended with respect to the exemplary embodiment, in particular in order to adapt the air mixing and distribution to desired requirements or in order to adapt the vehicle air-conditioning system to predefined installation space conditions.

FIG. 11 shows a perspective sectional view of the vehicle air-conditioning system 10, with the above-described components, the straight arrows indicating the flow direction of the cold or warm air and the bent arrows indicating the regions of air mixing.

In the following text, the method of operation of the vehicle air-conditioning system 10 will be described. During pure cold air operation of the vehicle air-conditioning system 10, the warm air flap 24 and the bypass flap 40 are closed completely and the cold air flap 18 is opened completely, and the cold air which flows through the cold air opening 26 is distributed to the mixed air outlets 42, 44, 46, 48 by the second air deflection element 56.

During pure warm air operation, the cold air flap 18 and the bypass flap 40 are closed completely and the warm air flap 24 is opened completely, and the warm air which flows through the warm air opening 28 into the air distribution chamber 30 is distributed to the various mixed air outlets 42, 44, 46, 48 in the air distribution chamber 30.

During mixed air operation, both the cold air flap 18 and the warm air flap 24 are opened at least partially and the bypass flap 40 is situated in an open position which is dependent on the open positions of the cold air flap 18 and the warm air flap 24.

Furthermore, a ventilation mode is provided, in which both the cold air flap 18, the warm air flap 24 and the bypass flap 40 are opened completely, as a result of which a maximum air flow through the vehicle air-conditioning system 10 is made possible. Temperature control is provided in this case by corresponding actuation of the evaporator 14 and/or of the heat exchanger 22. For example, the heat exchanger 22 can be decoupled, with the result that the air which flows through the heat exchanger is not heated.

The invention claimed is:

1. An air mixing and distribution apparatus for a vehicle heating or air-conditioning system having an air distribution chamber, into which a cold air duct opens with a cold air opening and a warm air duct opens with a warm air opening,
the warm air opening being formed by the outlet of a heat exchanger, the cold air opening and the warm air opening lying next to one another and in the same plane, and the cold air which flows through the cold air opening and the warm air which flows through the warm air opening flowing into the air distribution chamber substantially in the same main flow direction,
the air distribution chamber having a mixed air outlet for the windscreen and a mixed air outlet for a front diffuser, the mixed air outlets being spaced apart from one another,
and a first air deflection element being provided within the air distribution chamber, which first air deflection element deflects the warm air flow in the direction of the cold air opening, and
a second air deflection element being provided within the air distribution chamber, which second air deflection element deflects the cold air flow in the direction of the warm air opening;
wherein a cold air bypass opening is provided which opens into the air distribution chamber and is arranged next to the warm air opening on the side of the warm air opening which faces away from the cold air opening; and
wherein a bypass deflection element is provided, the bypass deflection element guiding a bypass cold air flow through the cold air bypass opening to at least one mixed air outlet, the bypass deflection element dividing the bypass cold air flow in the direction of the mixed air outlet for the windscreen and for side diffusers.

2. The air mixing and distribution apparatus according to claim 1, wherein the air distribution chamber has at least two opposed lateral mixed air outlets for lateral diffusers and the first air deflection element is continuous in the lateral direction.

3. The air mixing and distribution apparatus according to claim 1, wherein the second air deflection element has a plurality of air diversion ducts for cold air which are spaced apart from one another laterally, the air diversion ducts being V-shaped or U-shaped in cross section, the air diversion ducts diverting cold air beyond the first air deflection element to a mixed air outlet.

4. The air mixing and distribution apparatus according to claim 3, wherein the overall width of all the air diversion ducts of the second air deflection element to the width of the air distribution chamber has a ratio between 0.1 and 0.8.

5. The air mixing and distribution apparatus according to claim 3, wherein the first air deflection element extends such that it is bent towards the second air deflection element and the air diversion ducts extend such that they are bent with respect to the first air deflection element.

6. The air mixing and distribution apparatus according to claim 3, wherein the air diversion ducts of the second air deflection element have a first part duct and a second part duct which lead to the mixed air outlet for the front diffuser and to the mixed air outlet for the windscreen, respectively.

7. The air mixing and distribution apparatus according to claim 1, wherein at least one pair of mixed air outlets for front diffusers are provided on a side wall of the air distribution chamber.

8. The air mixing and distribution apparatus according to claim 1, wherein the air distribution chamber has a centre wall which extends in the main flow direction and substantially centrally between side walls and divides the air distribution chamber into two halves which are in each case assigned to one vehicle side.

9. The air mixing and distribution apparatus according to claim 1, wherein mixed air outlets for side diffusers are provided on opposite side walls of the air distribution chamber.

10. The air mixing and distribution apparatus according to claim 9, wherein first cold air shut-off elements are provided which are arranged in the region of the side walls and form baffle plates for the cold air flow to the mixed air outlets for side diffusers.

11. The air mixing and distribution apparatus according to claim 9, wherein second cold air shut-off elements are provided which lie in the region of the cold air opening and close sections of the flow cross section, the second cold air shut-off elements being arranged in the centre of the air distribution chamber in the lateral direction of the apparatus.

12. The air mixing and distribution apparatus according to claim 1, wherein the maximum height of the air distribution chamber is smaller than the square root of the area of the warm air opening.

13. The air mixing and distribution apparatus according to claim 1, wherein the first air deflection element forms a crossflow opening for warm air, through which the warm air flow flows in the air distribution chamber, and wherein the area ratio of the effective cross section of the crossflow opening to the area of the outlet of the heat exchanger is between 0.9 and 0.3.

14. A vehicle heating or air-conditioning system having an air mixing and distribution apparatus according to claim 1, the cold air duct being provided with a cold air flap and the warm air duct being provided with a heat exchanger and a warm air flap which is arranged upstream of the heat exchanger.

15. The vehicle heating or air-conditioning system according to claim 14, wherein a cold air bypass duct is provided which connects the warm air duct to the air distribution chamber downstream of the warm air flap with bypassing of the heat exchanger and has a bypass flap.

16. The vehicle heating or air-conditioning system according to claim 15, wherein the bypass flap is actuated as a function of the degree of opening of the cold air flap and/or of the warm air flap.

17. The vehicle heating or air-conditioning system according to claim 14, wherein one of the air deflection elements or a further air deflection element of the air distribution chamber forms a holder of the heat exchanger and stabilizes the housing of the system.

18. An air mixing and distribution apparatus for a vehicle heating or air-conditioning system having an air distribution chamber, into which a cold air duct opens with a cold air opening and a warm air duct opens with a warm air opening,
  the warm air opening being formed by the outlet of a heat exchanger, the cold air opening and the warm air opening lying next to one another and in the same plane, and the cold air which flows through the cold air opening and the warm air which flows through the warm air opening flowing into the air distribution chamber substantially in the same main flow direction,
  the air distribution chamber having a mixed air outlet for the windscreen and a mixed air outlet for a front diffuser, the mixed air outlets being spaced apart from one another,
  and a first air deflection element being provided within the air distribution chamber, which first air deflection element deflects the warm air flow in the direction of the cold air opening, and
  a second air deflection element being provided within the air distribution chamber, which second air deflection element deflects the cold air flow in the direction of the warm air opening;
  wherein the maximum height of the air distribution chamber is smaller than the square root of the area of the warm air opening.

19. The air mixing and distribution apparatus according to claim 18, wherein the air distribution chamber has at least two opposed lateral mixed air outlets for lateral diffusers and the first air deflection element is continuous in the lateral direction.

20. The air mixing and distribution apparatus according to claim 18, wherein the second air deflection element has a plurality of air diversion ducts for cold air which are spaced apart from one another laterally, the air diversion ducts being V-shaped or U-shaped in cross section, the air diversion ducts diverting cold air beyond the first air deflection element to a mixed air outlet.

* * * * *